United States Patent [19]
Mathias
[11] 3,869,355
[45] Mar. 4, 1975

[54] METHOD FOR MAKING A MAGNETIC WIRE OF IRON AND NICKEL ON A COPPER BASE

[75] Inventor: Joseph S. Mathias, Riverton, N.J.
[73] Assignee: Sperry Rand Corporation, New York, N.Y.

[22] Filed: May 1, 1970
[21] Appl. No.: 31,866

Related U.S. Application Data

[60] Continuation of Ser. No. 689,042, Dec. 8, 1967, abandoned, which is a division of Ser. No. 443,399, March 29, 1965, Pat. No. 3,370,929.

[52] U.S. Cl. .................... 204/32 R, 204/32, 204/40, 204/43 T, 204/129.35, 204/DIG. 5
[51] Int. Cl. ....... C23b 5/50, C23b 5/58, C23b 3/06
[58] Field of Search ...... 340/174 PW; 204/32 R, 40, 204/43, 140.5, 141, 28

[56] References Cited

UNITED STATES PATENTS

| | | | |
|---|---|---|---|
| 1,920,964 | 8/1933 | Burns | 204/2 |
| 3,027,309 | 3/1962 | Stephen | 204/43 |
| 3,141,837 | 7/1964 | Edelman | 204/43 |
| 3,330,631 | 7/1967 | Tsu | 29/183.5 |
| 3,411,892 | 11/1968 | Sasaki et al. | 204/40 X |
| 3,441,494 | 4/1969 | Oshima et al. | 204/28 X |

*Primary Examiner*—F. C. Edmundson
*Attorney, Agent, or Firm*—Rene A. Kuypers

[57] ABSTRACT

There is disclosed herein a wire memory element which has the characteristic of non-destructive read out (NDRO). The NDRO memory element is characterized by an intermediate non-magnetic layer which is plated over a smooth wire substrate with a current density which imparts a desired surface roughness thereto. The rough topography of the non-magnetic layer imparts the required magnetic characteristic including $H_c$ to the magnetic film deposited as a top layer. The magnetic film is composed of a nickel-iron alloy with a trace of cobalt.

11 Claims, 1 Drawing Figure

PATENTED MAR 4 1975 3,869,355
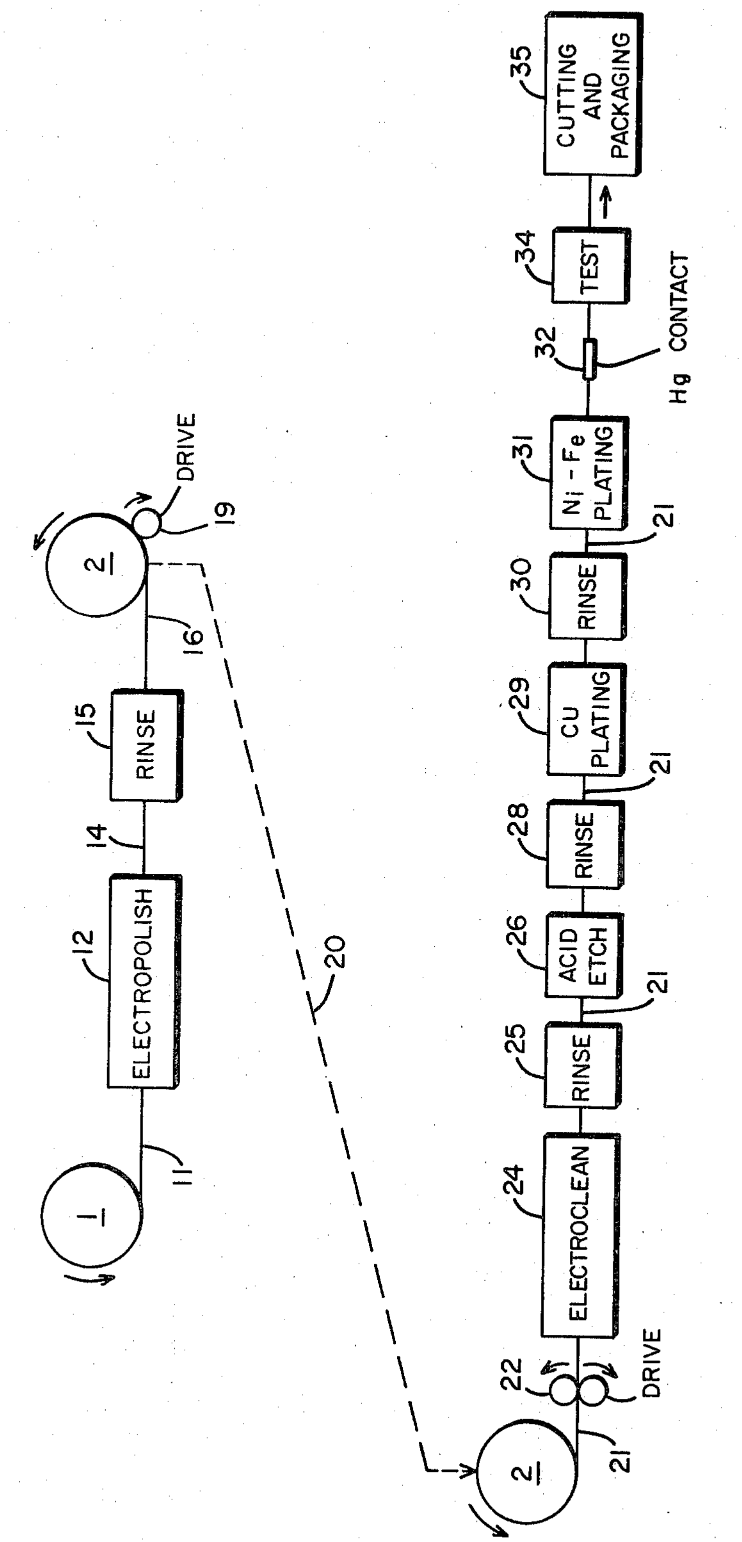
INVENTOR
JOSEPH S. MATHIAS
BY Rene A. Kuypers
ATTORNEY

METHOD FOR MAKING A MAGNETIC WIRE OF IRON AND NICKEL ON A COPPER BASE

This a continuation of U.S. patent application Ser. No. 689,042, filed Dec. 8, 1967, now abandoned, which is a division of U.S. patent application, Ser. No. 443,399, filed Mar. 29, 1965, now Pat. No. 3,370,929. This invention relates to magnetic wire and to a method of producing magnetic wire. More particularly, this invention relates to a method of producing magnetic wire having improved, reproducible physical and magnetic properties.

Magnetic wire suitable for computer use has been produceed by electrodepositing on a non-magnetic, electrically conductive wire substrate, such as copper wire having a diameter of about 5 mils, a coating of magnetic material, such as a coating of nickel, iron, e.g. Permalloy.

In the preparation of magnetic wire for use in a magnetic wire memory element a strong anisotropy favoring an orientation of the magnetization in the circumferential direction is established therein. Axial interrogation magnetic fields cause the magnetization vector to rotate reversibly to an angle of less than 90° thereby causing the circumferential component of the magnetization to decrease. This change of circumferential flux induces an emf in the wire which results in an output signal observable across the ends of the wire. Since the rotation is reversible, the magnetization vector returns to its original orientation upon removal of the axial field, and therefore read out is non-destructive. This reversibility relies upon the existence of a large magnetic anisotropy in the magnetic wire. Magnetic anisotropy in the electrodeposited magnetic coating is obtained by the imposition of a magnetic field during electrodeposition. This is effected by passing a direct current through the non-magnetic, electrically conductive wire substrate during the electrodeposition of the magnetic material thereon. This procedure results in a magnetic film with an anisotropy that favors the orientation of the magnetization in the circumferential direction.

In the past it has been the practice to carefully manufacture the copper wire so as to provide a very smooth uniform surface prior to the electrodeposition of the magnetic material thereon. The preparation of copper wire having a very smooth and uniform surface to meet the demanding standards required of magnetic wire has been very difficult operation. Even after excerising great care it has been difficult to prepare by conventional techniques magnetic wire having uniform and reproducible magnetic properties.

It is an object of this invention to provide an improved magnetic wire material.

It is another object of this invention to provide a magnetic wire material having improved and reproducible magnetic properties.

Still another object of this invention is to provide an improved technique for the manufacture of magnetic wire.

How these and other objects of this invention are accomplished will become apparent in the light of the accompanying disclosure made with reference to the accompanying drawing which schematically illustrates the process steps, and combinations thereof, in accordance with this invention.

In accordance with this invention it has been discovered that magnetic wire having improved and reproducible properties, particularly magnetic properties, is obtainable from a non-magnetic, electrically conductive wire substrate which has been coated with an electrodeposited layer of magnetic material, such as magnetic material consisting essentially of nickel and iron, and containing a very minor amount, about 0.1% by weight, cobalt. In accordance with one embodiment of this invention an improved magnetic wire material is provided by a non-magnetic, electrically conductive wire substrate, such as copper wire or a beryllium copper wire analyzing about 2.8% by weight beryllium, which has electrodeposited thereon as a magnetic coating an admixture of nickel, iron and cobalt analyzing about 81% by weight nickel, about 19% by weight iron and a very minor amount of cobalt in the range about 0.02–0.2% by weight.

In the production of an improved magnetic wire in accordance with this invention it has been found that the non-magnetic, electrically conductive wire substrate material upon which the magnetic material is electrodeposited must undergo special preparation so as to provide a suitable surface for the electrodeposition thereon of the magnetic material to yield a magnetic wire product having improved, uniform and reproducible magnetic properties.

Although theoretically in the practice of this invention substantially any non-magnetic, electrically conductive wire substrate material may be employed for the manufacture of magnetic wire in accordance with this invention, it is preferred to employ copper wire, specifically beryllium copper wire containing a minor amount about 3% by weight beryllium. The non-magnetic, electrically conductive substrate material may have substantially any desired or preferred thickness or diameter, such as a diameter in the range 2–50 mils, e.g. 5–10 mils.

In accordance with the practice of this invention, prior to the electrodeposition of the magnetic material onto the nonmagnetic, electrically conductive wire substrate material, the wire substrate material is subjected to an electropolishing operation. In the electropolishing operation which is an a electrochemical process (the reverse of electroplating), metal is removed rather than deposited. During the elelctropolishing operation metal is removed from the wireform substrate material undergoing electropolishing to smooth the substrate material being electropolished. In the electropolishing operation the nonmagnetic, electrically conductive wire substrate material is employed as the anode. Electropolishing is conventionally carried out employing direct current at current densities in the range 50–500 amperes per square foot. Electropolishing has been carried out commercially for many years and in commercial electropolishing operations wire over 700 feet in length has been uniformly tapered to within 0.0001 inch tolerance by electropolishing.

In accordance with another embodiment and feature of this invention the non-magnetic electrically conductive wire substrate material, desirably after having been electropolished, is subjected to an electrocleaning operatioon prior to the electrodeposition of the magnetic material thereon. Like electropolishing, electrocleaning is a conventional commercial electro-treating operation. In the electrocleaning operation the wire substrate material has removed grease, dirt and related extraneous material from the surface thereof due to the evolution of gases generated on its surface during the electrocleaning operation.

In accordance with another embodiment and feature of this invention the non-magnetic, electrically conductive wire substrate material, desirably after having been electropolished and/or electrocleaned, is subjected to an etching operation, specifically an acid etch operation, for the removal of oxides from the surface of the wire substrate material. The acid etching operation is a conventional commercial operation and is carried out by immersing or passing the non-magnetic, electrically conductive wire substrate material through the acid etchant bath, such as a nitric acid bath.

In accordance with yet another feature and embodiment of this invention the non-magnetic electrically conductive wire substrate material, desirably after having been electropolished and/or electrocleaned and/or acid etched for oxide removal, is subjected to a plating operation wherein a coating of non-magnetic, electrically conductive material is deposited thereon under uniform, controlled conditions.

Desirably, the non-magnetic, electrically conductive material electrodeposited on the wire substrate material is substantially chemically similar to the material making up the wire substrate upon which it is deposited. Specifically, when copper or beryllium copper is employed as the non-magnetic, electrically conductive wire substrate copper is deposited thereon in this electroplating or electrodeposition operation, the electrodeposited copper having substantially the same chemical and physical properties as the underlying wire substrate material and deposited in the thickness in the range 5,000 – 20,000 A. Other materials may be electrodeposited upon the non-magnetic, electrically conductive wire substrate depending upon the composition of the wire substrate material.

In accordance with yet another embodiment and feature of this invention there is deposited on the non-magnetic, electrically conductive wire substrate material, desirably after the wire substrate material has been electropolished and/or acid etched and/or electroplated, a coating or film of magnetic material, ±as a coating of magnetic material consisting essentially of nickel, about 81% by weight, iron, about 19% by weight, and a very minor or trace amount of cobalt, about 0.1% by weight and usually having a thickness in the range 5,000 – 20,000 A.

The coating of magnetic material may be substantially of any desired and suitable thickness. The thickness usually depends upon the specifications and magnetic properties desired in the magnetic wire. The magnetic coating which forms the outside layer of the magnetic wire should be thick enough to provide a useful amount of flux yet not so thick as to impair high speed switching characteristics. A magnetic coating having a thickness greater than the skin depth utilized by a fast pulse would be unused. A coating thickness of about $1.2\mu$ has been employed in some magnetic wire materials and is useful in magnetic wire materials prepared in accordance with this invention. Generally, a magnetic coating having a thickness of about 10,000 A –500 A provides useful magnetic properties in a magnetic wire element prepared in accordance with this invention.

Reference is now made to the drawing which schematically illustrates a preferred combination of operations in accordance with this invention for the preparation of magnetic wire materials.

Referring now to the drawing a spool 1 of non-magnetic electrically conductive wire material, such as copper or beryllium copper wire having a diameter of about 5 mils, supplies a continuous length of wire 11 which passes to an anodic electropolishing operation 12. In the electroplishing operation the wire 11, anodically charged, passes through a bath of phosphoric acid, such as orthophosphoric acid ($H_3PO_4$) assaying about 85–87% $H_3PO_4$. In the electropolishing operation wire 11 passes through a concentric copper cathode at a rate of about 9 inches per minute. The voltage differential maintained during the electropolishing operation is desirably in the range 4.5–5 volts and the temperature of the phosphoric acid electropolishing bath is desirably maintained at a temperature in the range 130–140°F. Satisfactory results have been obtained when the wire 11 has passed through an electroplishing bath having an overall length of about 5.5 inches, thereby providing a residence time in the electropolishing bath of about 35–40 seconds. Other suitable conditions for effecting electropolishing of wire 11 are possible and would suggest themselves to those skiled in the art. During the electropolishing operation a thin film of copper metal is removed from wire 11 and the resulting wire made smooth to substantially uniform surface characteristics and size.

The resulting electropolished wire 14 is then rinsed with cold tap water in rinsing station 15 and air dried and the electropolished, rinsed wire 16 taken upon spool 2 which is driven by suitable means 19. Desirably, during the electropolishing operation wire 11 undergoing treatment is maintained under substantially constant tension and the overall electropolishing and rinsing and drying operations, including unwinding and winding of the wire, is carried out to mimimize bending and dragging of the wire.

Spool 2 of electropolished wire 16 is transferred by suitable means to another location as indicated in the drawing by dashed line 20.

Spool 2 by means of a suitable electrical contact has a voltage applied across the length of the wire generated therefrom such that during the sequence of treating operations to be described a direct current flows through the wire substantially continuously during the to be described sequence of operations, electrocleaning, acid etching, copper plating and magnetic coating and deposition. Unlike the wire in the electropolishing operation wire 21 pulled off from spool 2 is cathodically charged, the wire 21 being pulled off by suitable constant torque driving means 22 so that the wire passes off spool 2 and is subjected to the treating operations to be described under substantially zero stress with a minimum bending.

Wire 21 is introduced into electrocleaning station 24 for removal of grease, dirt and extraneous matter from the surface thereof. The electrocleaning solution employed is alkaline, such as may be provided by dissolution of a suitable amount of sodium phosphate in water, and desirably includes a surfactant or detergent. A satisfactory electrocleaning operation has been carried out by employing as the electrocleaning bath a solution obtained by dissolving 75 grams of Oakite 191, a proprietary product manufactured and sold by Oakite Products, Inc., in a liter of water. Further, satisfactory results have been carried out in an electrocleaning operation employing platinum wire as the anode, the electrocleaning solution being maintained at a temperature of about 140° F. and employing an electrocleaning current in the range 80–100 ma. Also, satisfactory results have been obtained with an electrocleaning cell or unit measuring 2 inches in length.

Following the electrocleaning operation the wire 21 is subjected to a water rinse at rinsing station 25.

Electrocleaned, rinsed wire 21 is then subjected to an acid etching operation at acid etching station 26, such as by immersion in an acid bath, eg. nitric acid, or a bath of a proprietary acid etchant, e.g. Enthone Actane 97, manufactured and sold by Enthone, Inc. A suitable acid etchant bath has been prepared by dissolving b 90 grams of Enthone Actane 97a in 1 liter of water and 150 grams of Enthone Actane 97b in 1 liter of water. The acid etching operation is carried out at about ambient or room temperature and an acid etching cell measuring about 2 inches in length has been found to yield satisfactory results. Following the acid etching operation the etched wire is rinsed with water at rinsing station 28.

The resulting electrocleaned, acid etched and rinsed wire 21 is then subjected to a copper plating operation under conditions to deposit a coating of copper thereon, such as a copper coating measuring about 10,000 A ±500 A in thickness. The copper plating or coating operation is carried out at plating station 29. Satisfactory copper plating results have been obtained by employing as the copper plating electrolyte, a solution containing 20–25 grams per liter of copper, as metal, 2.5–8 grams per liter free $CN^-$ as KCN, the weight ratio of Cu to KCN in the bath being greater than 3. The bath also desirably contains Rochelle salts in the amount of about 28 grams per liter and is maintained at a pH in the range 10–11 and at a temperature of about 120° F. during the copper plating operation. In the copper plating operation the anode material is desirably platinum and a plating current of about 15–35 ma is employed; however, a wide range of plating currents may be utilized which comprises from 15 to 100 milliamperes. Satisfactory results have been obtained with a copper plating cell measuring 2 inches in length.

The purpose of the copper plating operation is to provide or to impart to the wire a controlled smoothness or roughness which serves to better control the $H_c$ of the magnetic coating subsequently deposited in the next treating operation. Therefore, it is seen that the copper plating operation serves to provide a wire having controlled, reproducible surface characteristics. Following the copper plating operation the plated wire is rinsed with water at rinsing station 30.

Following the copper plating operation wire 21 is plated with a magnetic coating containing nickel and iron at magnetic plating station 31.

The electrolyte employed at magnetic plating station 31 is made up of nickel sulfamate and iron sulfamate, preferably derived from nickel and iron sulfamate solutions manufactured and sold by Barrett Chemical Products Division of Allied Research Products, Inc. Barrett nickel sulfamate solution and Barrett iron sulfamate solution in the amounts 990 cc and 10 cc, respectively, make up the electrolyte solution together with 1.0–1.5 grams of $CoSO_4.7H_2O$, boric acid in the amount of 20 grams and the trisodium salt of naphthalene tri-sulfonic acid in the amount of 16.5 grams. Sulfamic acid is employed to adjust the pH of the electrolyte to a value in the range 2.7–3.3. Also, the nickel to iron weight ratio in the electrolyte is desirably in the range 46–52 and the amount of nickel as metal in the electrolyte is desirably in the range 75–85 grams per liter. During the magnetic plating operation the electrolyte is desirably maintained at a substantially constant temperature in the range 148–151°F. Particularly satisfactory results have been obtained by employing a platinum electrode and a substantially constant plating current in the range 22–24 ma, the electroplating cell having a length of about 1 inch. Further, satisfactory plating results have been obtained by flowing the above-described electrolyte under the aforesaid plating conditions through the electroplating cell at a rate of about 1000 cc per minute.

Throughout the above-described operations including electrocleaning, acid etching, copper plating and nickel-iron magnetic coating plating, the wire is moved through the stations and operations at a substantially constant rate of about 3 inches per minute while there flows through the wire undergoing treatment a bias current of about 800 ma. Substantially higher processing rates or speeds are possible however, such as 9 inches per minute and higher, depending upon the results desired and the characteristics of the system. This bias current continuously passes through wire 21 during processing and serves to set up a magnetic field around the wire which circumferentially orients the easy direction of the electrodeposited magnetic nickel-iron coating. As indicated hereinabove, it is a feature of this invention that the magnetic electrodeposited nickel-iron coating also contains a very minor amount, varying from a trace amount up to about 0.1% by weight, of cobalt. For example, the magnetic film deposited as the outer coating of the magnetic wire in accordance with this invention would analyze about 81% by weight nickel, 19% by weight iron, about 0.1% by weight cobalt and would have a thickness of about 10,000 A.

Of special mention, during the electrodeposition of the magnetic coating on the wire a skew coil current of about 80–100 ma is passed through a coil encompassing the plating cell. The skew coil current serves to set up a field which cancels the earth's field at the plating location and any stray fields.

Following the magnetic plating operation the resulting wire is then passed through a mercury contact unit 32 and test station 34 and then passed through cutting and packaging station 35.

In the plating operation it has been found that the amount of cobalt in the electrolyte serves to control the $H_K$ value of the magnetic coating, i.e., the non-destructive read out property of the magnetic coating. Accompanying Table I illustrates the effect of addition of $CoSO_4.7H_2O$ to the magnetic plating bath on the magnetic properties of the resulting electrodeposited magnetic coating. The values set forth in accompanying Table I were obtained from beryllium copper wire which had been copper plated from a cyanide bath at room temperature and employing a copper plating current of about 14 ma. The NiFe electrolyte plating bath analyzed 52.2 grams per liter nickel, 0.98 grams per liter iron and had a nickel to iron weight ratio of about 53.3. The Ni-Fe electrolyte bath was maintained at a pH of about 2.2, a temperature of about 140° F. and at a plating current of about 22.5 ma.

TABLE I

| $CoSO_4.7H_2O$ (grams per liter in bath) | $H_K$ (oes) of Magnetic Coating |
|---|---|
| 0 | 3.3 |
| 0.5 | 4.2 |
| 1.0 | 5.0 |
| 1.5 | 6.7 |

It has also been observed that in the practice of this invention the current density employed during the copper plating operation influences the magnetic properties of the subsequently electrodeposited magnetic coating since the current density employed controls the roughness or smoothness of the electrodeposited copper. For example, as illustrated in accompanying Table II nickel-iron magnetic material was deposited from a bath containing 1.5 grams $CoSO_4.7H_2O$ grams per liter maintained at a pH of 2.5 and at a temperature of 140° F. and at a plating current of about 28 ma during the plating operation. Prior to the electroplating of the nickel-iron magnetic coating under the aforesaid conditions the wire had been electroplated with copper from a cyanide bath maintained at a temperature of about 120° F. while employing varying plating current densities. The effect of the copper plating current density upon the magnetic properties of the subsequently electroplated nickel-iron-cobalt magnetic coating is illustrated in Table II:

TABLE II

| Cu Plating Current (ma) | $I_{HK}$ (ma) | $I_{Hc}$ (ma) |
|---|---|---|
| 56 | 1150–1200 | 68–100 |
| 63 | 1150 | 76–100 |
| 70 | 950–1100 | 95–110 |
| 80 | 1050–1150 | 95–100 |
| 100 | 900–950 | 95–100 |

As will be apparent to those skilled in the art in the light of the foregoing disclosure many substitutions, modifications and alterations are possible in the practice of this invention without departing from the spirit or scope thereof.

What is claimed is:

1. The method of making a plated-wire memory element haivng an information-storing magnetic film covering a wire-like non-magnetic wire strand which comprises the steps of:

a. producing a relatively smooth and clean surfaced non-magnetic wire strand;

b. electroplating a controlled rough non-magnetic metallic surface on said non-magnetic wire strand using a copper cyanide electrolyte with a plating current of about 15–100 milliamperes;

c. electroplating on said controlled rough surface a magnetic film having a ratio of about 80% nickel and 20% iron with a trace of cobalt;

d. the plating current utilized during the second-mentioned step producing a controlled surface roughness, which is effective to control at least the coercive force, $H_c$, of the magnetic film;

e. carrying out the third-named step in the presence of a bias current flowing in said wire strand; and f. said bias current establishing a circumferential easy axis of magneitzation in the magnetic coating on said wire, said magnetic film having a non-destructive read-out characteristic.

2. The method of making a plated wire memory in accordance with claim 1 wherein said metallic surface is made of copper.

3. The method in accordance with claim 1 wherein said metallic surface is deposited with a thickness of approximately 5,000 to 20,000 A.

4. The method in accordance with claim 1 wherein said wire is electrocleaned prior to applying said metallic surface.

5. The method of making a plated wire memory in accordance with claim 1 wherein said wire is made of beryllium-copper.

6. The method of making a plated wire memory in accordance with claim 1 wherein said bias current flowing through said wire during the electroplating of said magnetic film is on the order of 800 milliamperes.

7. The method of making a plated wire memory in accordance with claim 1 wherein a plating current on the order of 22 – 24 milliamperes is employed during the electrodeposition of said magnetic coating.

8. The method of making a plated-wire memory in accordance with claim 1 wherein said magnetic film has a thickness of 5,000–20,000 A.

9. The method in accordance with claim 1 wherein the solution for electroplating said rough copper surface comprises alkaline copper.

10. The method in accordance with claim 9 wherein the solution for electroplating said controlled rough non-magnetic metallic surface comprises an electrolyte solution containing 20–25 grams per liter of Cu, as metal, 2.5–8 grams per liter 3CN as KCN, the weight ratio of Cu to KCN in the bath being greater than 3 and maintained at pH in the range of 10–11.

11. The method of making a non-destructive read-out magnetic memory element with a circumferential EASY axis upon a smooth and clean surfaced non-magnetic substrate which comprises the steps of:

a. plating a controlled rough non-magnetic metallic surface on said non-magnetic substrate utilizing a copper cyanide electrolyte and a plating current of about 15–100 milliamperes;

b. plating a magnetic film comprising about 80% nickel and 20% copper with a trace of cobalt on said controlled rough surface in the presence of a magnetic field to establish a circumferential EASY axis of magnetization, said rough metallic surface being such as to control the $H_c$ of the magnetic film.

* * * * *